(12) United States Patent
Islam Ahmad

(10) Patent No.: US 10,533,880 B2
(45) Date of Patent: Jan. 14, 2020

(54) POSITION SENSING USING WAVEGUIDE CONFIGURED TO CONDUCT MECHANICAL PULSES TRIGGERED BY MAGNETOSTRICTION

(71) Applicant: SICK ATech GmbH, Witten (DE)

(72) Inventor: Saiful Islam Ahmad, Lüdenscheid (DE)

(73) Assignee: SICK ATECH GMBH, Witten (DE)

( * ) Notice: Subject to any disclaimer, the term of this patent is extended or adjusted under 35 U.S.C. 154(b) by 108 days.

(21) Appl. No.: 15/717,203

(22) Filed: Sep. 27, 2017

(65) Prior Publication Data

US 2018/0087935 A1  Mar. 29, 2018

(30) Foreign Application Priority Data

Sep. 29, 2016 (DE) .......................... 10 2016 118 522

(51) Int. Cl.
  *G01D 5/48*  (2006.01)
(52) U.S. Cl.
  CPC .................................... *G01D 5/485* (2013.01)
(58) Field of Classification Search
  CPC . G01R 33/02; G01B 7/30; G01B 7/14; G01B 7/00
  See application file for complete search history.

(56) References Cited

U.S. PATENT DOCUMENTS 6,401,883 B1  6/2002  Nyce et al.
9,182,213 B2 * 11/2015  Zem ....................... G01B 7/023

2001/0017539 A1 *  8/2001  Brunsch ................. G01D 5/485
                                                         324/207.13

(Continued)

FOREIGN PATENT DOCUMENTS

CN      104069255 A      4/2013
CN      103884267 A      6/2014
CN      203758450 U      8/2014

(Continued)

OTHER PUBLICATIONS

European office action dated Jan. 24, 2018 for corresponding application EP17190968.2.

(Continued)

*Primary Examiner* — Tung X Nguyen
(74) *Attorney, Agent, or Firm* — Nath, Goldberg & Meyer; Jerald L. Meyer; Stanley N. Protigal

(57) ABSTRACT

A position sensor comprises a waveguide of a magnetostrictive material, which extends along a measurement path and which is configured for conducting mechanical pulses triggered by magnetostriction, and a housing for the waveguide. A positioning element is provided which is elastic at least regionally; which is held in the housing while being deformed; and which has a recess which extends along the measurement path and forms a receiver for the waveguide. In the position sensor in accordance with the invention, the recess has a slit which extends along the measurement path; which, viewed in a cross-sectional plane, reaches from a reception section up to a boundary of the positioning element; and which enables a lateral insertion of the waveguide into the reception section. The invention furthermore comprises a method of manufacturing a position sensor in accordance with the invention.

20 Claims, 6 Drawing Sheets

(56) References Cited

U.S. PATENT DOCUMENTS

2004/0090225 A1   5/2004  Barr et al.
2007/0296404 A1  12/2007  Steinich

FOREIGN PATENT DOCUMENTS

| CN | 104251657 A | 12/2014 |
|---|---|---|
| DE | 19753805 C2 | 6/1999 |
| DE | 10348195 A1 | 6/2005 |
| DE | 102004018818 A1 | 11/2005 |
| DE | 202006012815 U1 | 12/2007 |
| EP | 0882212 A2 | 12/1998 |
| WO | 2016128021 A1 | 8/2016 |

OTHER PUBLICATIONS

German patent office communication dated Jul. 11, 2017 for corresponding application 102016118522.1.
MTS Sensors Group; "Temposonics Position Sensors"; 551019 A.
Office Action dated Jul. 3, 2019 issued in corresponding Chinese Application No. 2017109013655.

* cited by examiner

POSITION SENSING USING WAVEGUIDE CONFIGURED TO CONDUCT MECHANICAL PULSES TRIGGERED BY MAGNETOSTRICTION

FIELD

The present invention relates to a position sensor having a waveguide of magnetostrictive material, which extends along a measurement path and which is configured for conducting mechanical pulses triggered by magnetostriction, and having a housing, in particular a tubular housing, for the waveguide.

BACKGROUND

Such sensors are disclosed by way of example in DE 197 53 805 C2 and in the brochure "Temposonics Position Sensors", 551019 A of the company MTS (www.mtssensors.com/fileadmin/media/pdfs/551019.pdf) and are in particular used in industrial metrology to measure positions, lengths or covered distances. The waveguide can be a thin bar, a wire or a pipe of a ferromagnetic material such as iron, nickel or cobalt which can have a length of a few centimeters up to a plurality of meters, for example. A so-called "position magnet", for example in the form of a permanent magnet, which generates a magnetic field in the waveguide is typically attached to the component whose position should be detected. The position magnet can, for example, be of ring shape and surround the waveguide. If an electrical current pulse is sent through the waveguide, a further magnetic field which is variable with respect to time and place is generated in the environment of the waveguide in addition to the magnetic field generated by the position magnet. Due to the interaction of the two magnetic fields at the site of the position magnet, a mechanical pulse such as a longitudinal pulse and/or a torsion pulse can be generated in the waveguide and moves along the measurement path. A transducer of the position sensor typically serves to convert the mechanical pulses conducted by the waveguide into position signals. The transducer can, for example, comprise a coil or a piezoelectric measurement element. The transducer can, for example, be designed as described in EP 0 882 212 B1. The position of the position magnet can ultimately be determined by a measurement of the travel time of the mechanical pulse. Position sensors based on the magnetostrictive measurement principle work in a contactless manner and supply absolute values. They do not require a recalibration and they are also suitable for adverse conditions of use. They are frequently configured as linear path sensors.

Since position sensors of the named kind should often be used in rough environments, for example in pressurized hydraulic cylinders, the housing for the waveguide has to be relatively stable and resistant. The measurement path is generally relatively long, typically over one meter. This means that the thin waveguide has to be introduced into and centered in the housing over such a large path.

In known systems, the waveguide is jacketed by an acrylic pipe or by a fiber glass pipe which is arranged in the housing. Unavoidable gaps between the waveguide and the jacket as well as between the jacket and the housing have the result that the waveguide moves during the operation and is decentered in the process. In addition, it has been shown in practice that the jackets do not provide sufficient protection against shocks and vibrations. A kinking or a jamming of the waveguide may occur on the introduction of a waveguide into an acrylic pipe or fiber glass pipe having a length of one or more meters.

A position sensor is disclosed in DE 197 53 805 C2 in which the waveguide is supported in a support of insulating material. A pressing sleeve is pressed onto the axial end region of the waveguide together with the insulating material on the assembly.

WO 2016/128021 A1 discloses a magnetostrictive path measurement apparatus in which the waveguide is supported in an elastic support hose which is in turn arranged in a support pipe.

Magnetostrictive path measurement apparatus having elastic support elements are also disclosed in US 2004/0090225 A1, in US 2001/0017539 A1 and in U.S. Pat. No. 6,401,883 B1.

SUMMARY

It is an object of the invention to provide a position sensor which can easily be manufactured and which has a waveguide which is positioned as exactly as possible and held in a reliable manner.

The object is satisfied by a position sensor having a waveguide of magnetostrictive material, with the waveguide extending along a measurement path and configured to conduct mechanical pulses triggered by magnetostriction. The waveguide has a housing and a positioning element. The positioning element is elastic at least regionally and is held in the housing while being deformed. A recess in the positioning element receives the waveguide. The recess has a slit extending along the measurement path and reaches from a reception section up to a boundary of the positioning element and enables a lateral insertion of the waveguide into the reception section.

A position sensor in accordance with the invention comprises a positioning element which is elastic at least regionally; which is held in the, preferably tubular, housing while being deformed; and which has a recess which extends along the measurement path and forms a receiver for the waveguide. The elastic positioning element can serve as a positioning aid on the assembly of the position sensor.

Due to its inherent elasticity, the positioning element is tensioned in the housing. The positioning element is in this manner held securely in the housing after the assembly, with additional holder elements such as pressing sleeves not being necessary. Since the waveguide is received in the recess provided at a defined location, the position of the waveguide in the housing is reliably fixed. If a centering of the waveguide in the tubular housing is desired, the positioning element can act as a centering element.

A self-centering of the waveguide can take place during the assembly by using the positioning element. The assembly is in particular simplified for this reason, since a positioning of the waveguide does not have to be observed as soon as it is received in the recess of the positioning element. In addition to a positioning of the waveguide in the housing, the positioning element also effects a mechanical damping which protects the waveguide from an impairment by shocks and vibrations.

In accordance with the invention, the recess has a slit which extends along the measurement path; which, viewed in a cross-sectional plane, reaches from a reception section up to a boundary of the positioning element; and which enables a lateral insertion of the waveguide into the reception section.

The invention is particularly suitable in connection with waveguides which are configured for conducting torsion pulses triggered by magnetostriction.

The waveguide can be received with small clearance in the recess at least sectionally and preferably along the total measurement path. It is thereby ensured that the mechanical pulses caused by the magnetostrictive effect can propagate in the waveguide without impediment and that no falsifications of the measured values occur due to the damping of these pulses. In addition, an unwanted clamping or compression of the waveguide is avoided.

An embodiment of the invention provides that the positioning element completely surrounds the waveguide received in the recess in a peripheral direction when said positioning element is held in the housing while being deformed. The complete surrounding preferably takes place along the total measurement path. The waveguide is securely positioned and protected in this manner.

Provision can be made that, with respect to a cross-sectional plane of the position sensor, the positioning element is not completely peripherally supported at an inner wall of the housing or at an additional component contacting the inner wall when said positioning element is held in the housing while being deformed. The free spaces between the support regions which extend axially, preferably along the total measurement path, can be used for accommodating electrical lines and/or a return conductor extending in parallel with the waveguide. A full-area support of the positioning element at the inner wall of the housing or at an additional component contacting the inner wall can generally also be provided.

In accordance with a further embodiment of the invention, the recess is open toward a longitudinal side of the positioning element when the positioning element is in an undeformed starting state. It is then not necessary to thread the waveguide into the recess in an axial direction on the assembly. An insertion of the waveguide into the recess can rather take place in a simple manner from the longitudinal side.

A specific embodiment of the invention provides that the recess has a cross-sectional shape in the form of a keyhole when the positioning element is in an undeformed starting state. This is of advantage to the extent that the narrow slit-like section of such a recess closes on the deformation of the positioning element and thus ensures a complete surrounding of the waveguide in the peripheral direction, whereas the wide central section remains open and forms the receiver for the waveguide. The recess could generally also have a rectangular, triangular or trapeze-like cross-sectional shape.

The positioning element preferably has a trapeze-like outer cross-sectional shape when it is in an undeformed starting state. With such a shape, gaps or free spaces are automatically formed between the support points which are located in the corner regions and which can be used for accommodating electrical lines and/or a return conductor. The longer trapeze side is preferably located at a longitudinal side of the positioning element at which an opening of the recess is located. The longitudinal side reduces in size on a closing of the opening such that it e.g. at least substantially adopts the size of the other longitudinal side. In principle, the positioning element could also have a round or an oval outer cross-sectional shape in order e.g. to support a full-area contact at the inner wall of a housing having a round or an oval cross-section.

Provision can be made that the recess has a reception section which is arranged centrally with respect to a cross-section of the housing. Such a positioning element effects a self-centering of the waveguide in the housing of the position sensor.

In accordance with a further embodiment of the invention, the positioning element is completely produced from an elastic material. This enables a particularly simple manufacture.

The positioning element is preferably produced, in particular completely produced, from a non-magnetic material in order to avoid influences on the measured values.

The positioning element is preferably produced from a material which comprises a polymer or a plurality of polymers, in particular silicone. Such materials in particular have a high flexibility and elasticity.

The positioning element can be configured as an extruded section. This enables a particularly simple and inexpensive manufacture.

A further embodiment of the invention provides that the positioning element is received in an intermediate pipe which is flexible at least regionally and which in turn contacts an inner wall of the housing. The flexible intermediate pipe can in particular serve as an introduction aid on the assembly of the position sensor. Provision can be made that the intermediate pipe contacts the inner wall of the housing over its full area.

The intermediate pipe is preferably produced from a friction-reducing material and/or has a friction-reducing coating. This facilitates the introduction of the positioning element into the intermediate pipe and/or the introduction of the positioning element with the intermediate pipe into the housing.

The intermediate pipe can at least partly be produced from polytetrafluoroethylene or from silicone. These materials have a particularly pronounced friction-reducing effect.

The intermediate pipe can have at least one slit which extends along the measurement path. Such a slit can be used, as required, for the lateral introduction of the positioning element into the intermediate pipe. The slit can additionally ensure a sufficient flexibility of the intermediate pipe in a radial direction.

The intermediate pipe preferably has a thin-walled design. By way of example, the intermediate pipe can have a wall thickness in the range of fractions of a millimeter.

Provision can also be made that the positioning element is received in an arrangement of at least two separate and at least regionally flexible shell elements which in turn contact an inner wall of the housing. This facilitates the assembly to the extent that the shell elements are only to be placed at the positioning element from the outside.

A further embodiment of the invention provides that the housing is produced from a rigid non-magnetic material, in particular from stainless steel. This enables the use of the position sensor in particularly rough environments, for example in the hydraulic oil of a hydraulic cylinder. Alternatively, the housing can be produced from aluminum or from plastic.

The invention also relates to a method of manufacturing a position sensor such as has been described above, in which the following steps are provided:

providing a positioning element in an undeformed starting state;

introducing the waveguide into the recess of the positioning element; and introducing the positioning element with the waveguide received in the recess into the housing while deforming the positioning element.

The waveguide is therefore not introduced directly into the housing, but rather with the aid of a positioning element which ensures a correct alignment of the waveguide in the housing and furthermore damps shocks and vibrations.

Provision is made in accordance with the invention that the introduction of the waveguide into the recess of the positioning element takes place in a radial direction through a slit of the positioning element extending along the measurement path. This can be carried out substantially faster and more simply than an axial threading of the waveguide into a recess closed in the peripheral direction.

The positioning element is preferably introduced with the waveguide received in the recess into a flexible intermediate pipe and is then introduced into the housing together with said intermediate pipe. The flexible intermediate pipe has a friction-reducing effect and thus facilitates the pushing of the positioning element with the waveguide into the housing over a longer path. The introduction of the positioning element into the intermediate pipe can in particular take place through a lateral slit of the intermediate pipe.

Further developments of the invention are also set forth in the dependent claims, in the description and in the enclosed drawings.

BRIEF DESCRIPTION OF THE DRAWINGS

The invention will be described in the following by way of example with reference to the drawings.

DETAILED DESCRIPTION

Figure 1:
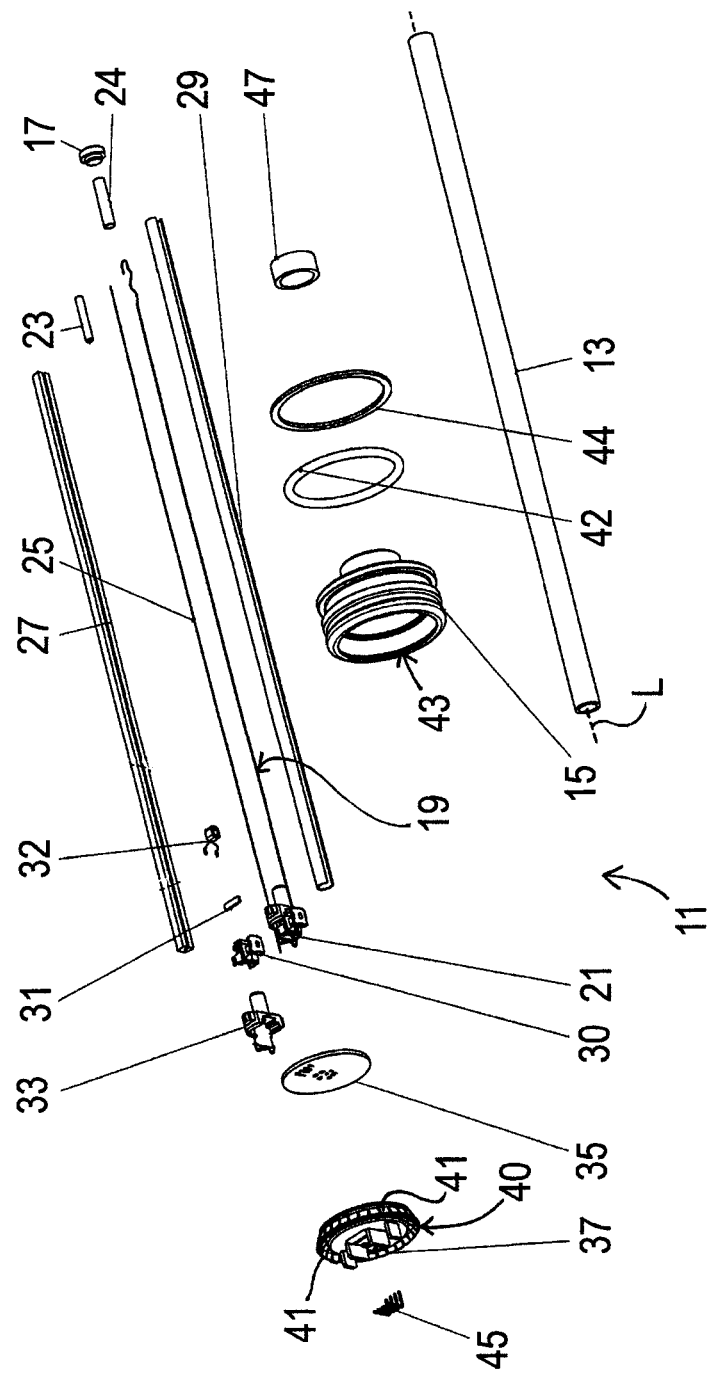
FIG. 1 is an exploded representation of a position sensor in accordance with the invention.

The position sensor 11 shown in an exploded representation in FIG. 1 comprises a waveguide housing 13 in the form of an elongated pipe of stainless steel to whose one pipe end a sensor head housing 15 is attached. The other pipe end is closed by an end cap 17. A waveguide 19 of a magnetostrictive material is located in the waveguide housing 13. The waveguide 19 is preferably a wire of ferromagnetic material and, starting from a control unit 21, extends axially, that is in parallel with the longitudinal axis L of the waveguide housing 13 and through said waveguide housing up to a damping element 23 which is held in the waveguide housing 13 using a sleeve 24. In the region of the damping element 23, the waveguide 19 merges into a return conductor 25 which again leads back to the control unit 21. The waveguide 19 is held in the waveguide housing 13 by means of a positioning element 27 and an intermediate pipe 29, as will still be explained in more detail in the following.

A transducer 30 is associated with the control unit 21 and comprises a bar magnet 31, which is fixedly soldered to the waveguide 19, and a coil 32 surrounding said bar magnet. The transducer 30 can convert torsion pulses conducted by the waveguide 19 into electrical position signals, such as is generally known—for example from EP 0 882 212 B1. A transducer receiver 33 is associated with the transducer 30 and, like the control unit 21, is attached to a circuit board 35. In FIG. 1, the following individual parts of the control unit 21 are, for reasons of clarity, shown separately again laterally next to the control unit 21: the transducer 30, bar magnet 31, coil 32 and transducer receiver 33.

The circuit board 35 with the components mounted thereat is accommodated in the sensor head housing 15. Said sensor head housing is closed by a cover part 37 which is provided with latching teeth 41 at its boundary 40. The latching teeth 41 are configured for engaging behind an inwardly projecting bead 43 of the sensor head housing 15. The cover part 37 can thus be plugged onto the sensor head housing 15 and can be permanently latched thereto on the plugging on. The sensor head housing 15 can be installed into a hydraulic cylinder using a sealing ring 42 and a support ring 44, such as is disclosed in DE 20 2006 012 815 U1, for example.

Contact pins 45 are provided at the cover part 37 for the connection of the position sensor 11 to a power supply and to a reception unit (both not shown). The contact pins are angled as shown in order to enable the connection of a connection plug or of a connection socket from the side. The position to be detected by the position sensor 11 is marked by a position magnet 47 which is of ring shape here and surrounds the waveguide housing 13. The position magnet 47 is fastened to a component which is not shown and whose position should be detected, e.g. to a displaceable piston of a hydraulic cylinder.

Figure 2:
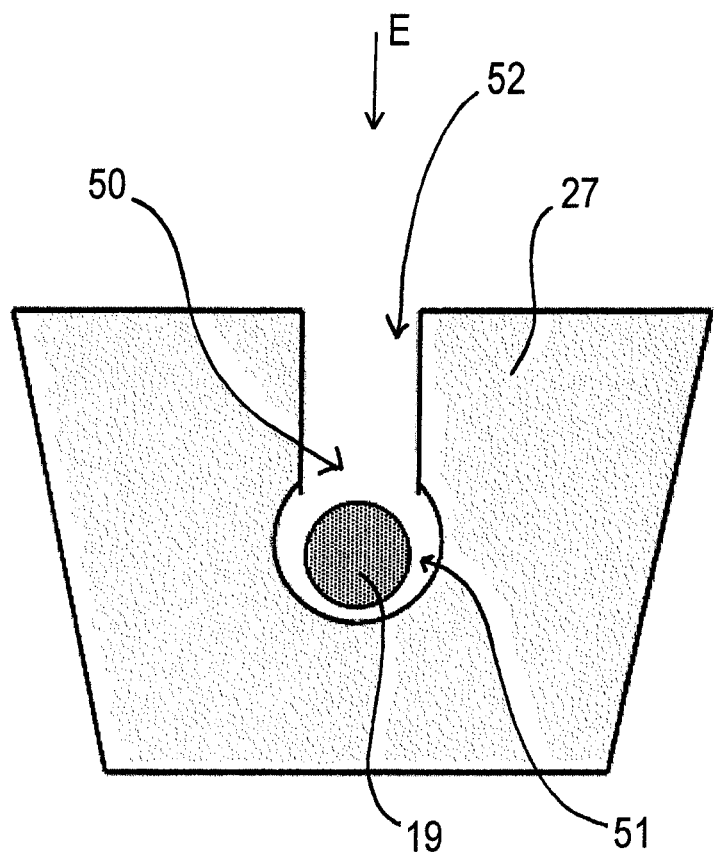
FIG. 2 is a cross-sectional view of a positioning element and of a waveguide of a position sensor in accordance with the invention, with the positioning element being in an undeformed starting state.

FIG. 2 shows the waveguide 19 and the positioning element 27 in a cross-sectional view. The positioning element 27 is produced from an elastic and non-magnetic material, e.g. from silicone, and can therefore be deformed. If it is in an undeformed starting state as shown in FIG. 2, it has a trapeze-like outer cross-sectional shape. A recess 50 having a cross-sectional shape in the form of a keyhole extends through the entire positioning element 27 in the axial direction. The waveguide 19 is arranged in the wide reception section 51 of the recess 50. The narrow introduction section 52 of the recess 50 extends up to the boundary of the positioning element 27 such that the waveguide 19 can be introduced into the positioning element 27 in a radial direction of introduction E.

Figure 3:
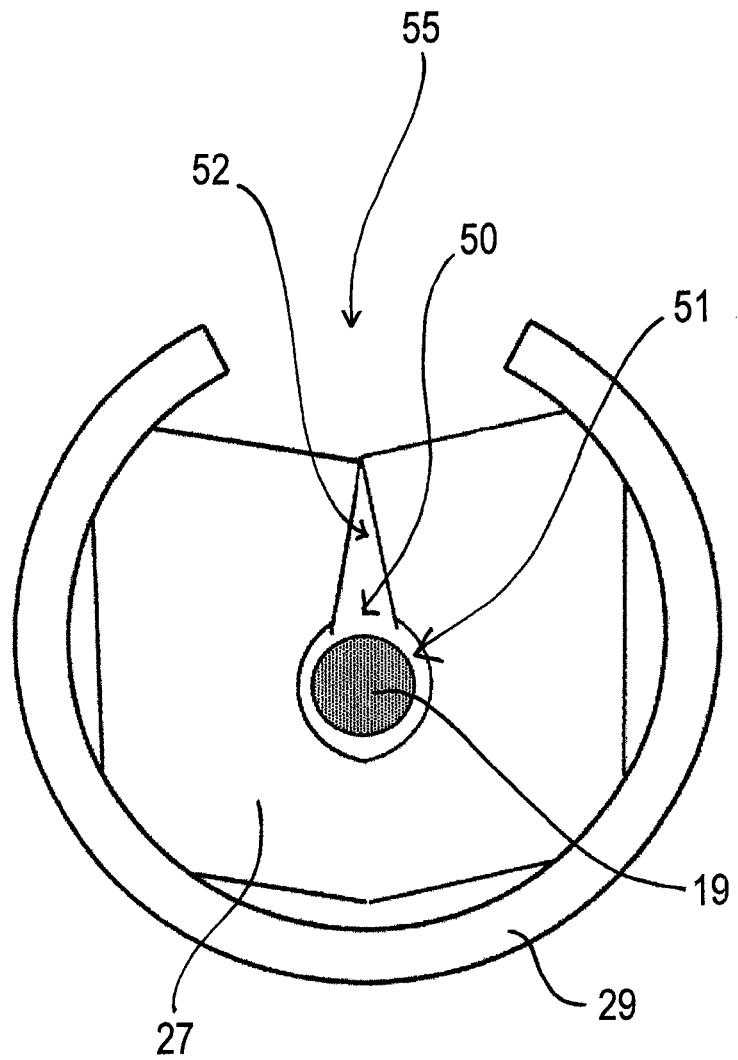
FIG. 3 shows the arrangement in accordance with FIG. 2 after the introduction into an intermediate pipe.

The positioning element 27 is introduced into the intermediate pipe 29 with the inserted waveguide 19 on the manufacture, as is shown in FIG. 3. A deformation of the positioning element 27 and in particular a closing of the narrow section 52 take place in the process. The introduction process is facilitated in that the intermediate pipe 29 is produced from polytetrafluoroethylene and has a longitudinal slit 55 which extends axially through the entire intermediate pipe 29.

Figure 4:
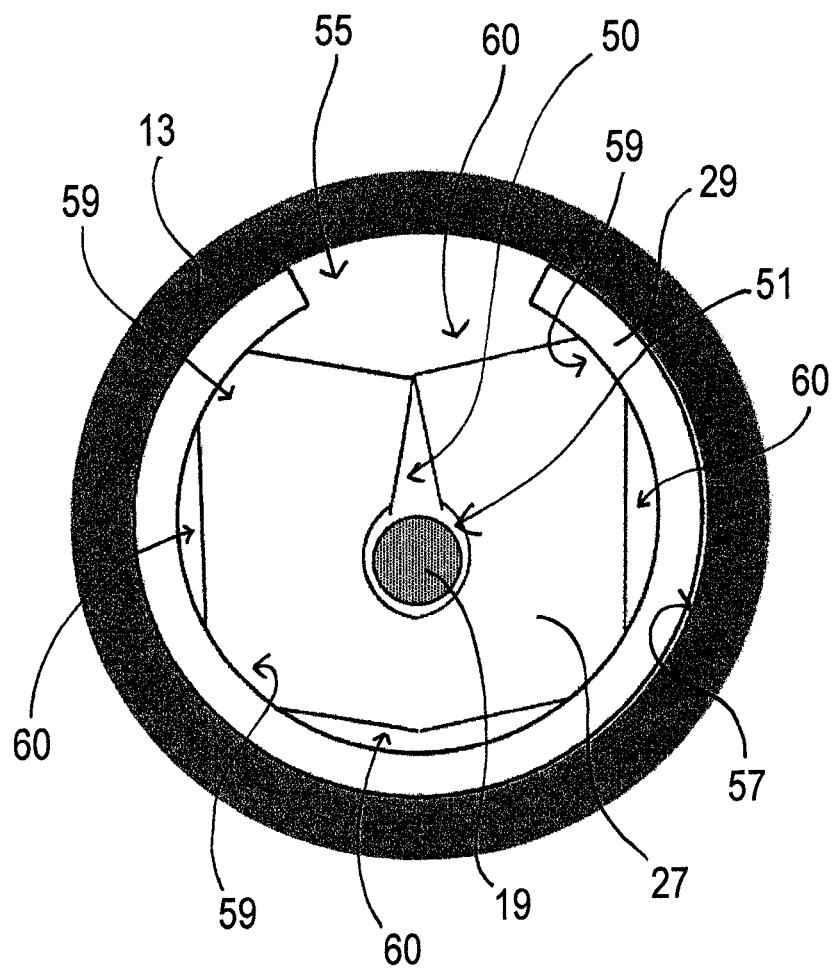
FIG. 4 shows the arrangement shown in FIG. 3 after the introduction into a waveguide housing.

The unit formed by the waveguide 19, the positioning element 27 and the intermediate pipe 29 is introduced into the waveguide housing 13 from one end until the state shown in FIG. 4 is achieved. The flexibility of the intermediate pipe 29 provided with the longitudinal slit 55 and the friction-reducing properties of the polytetrafluoroethylene facilitate the introduction process. The intermediate pipe 29 contacts the inner wall 57 of the housing 13 over its full area after the introduction. Due to the trapeze-like outer cross-section of the positioning element 27, said positioning element does not contact the intermediate pipe 29 over its full area, but rather only at the corner regions 59. Free spaces 60 are formed between said corner regions and can be used for the leading through of electrical lines and of the return conductor 25 (FIG. 1). Due to the positioning element 27 and to the intermediate pipe 29, the waveguide 19 is held centered in the waveguide housing 13, on the one hand, and is protected from excessive deflections, shocks and vibrations, on the other hand.

Figure 5:
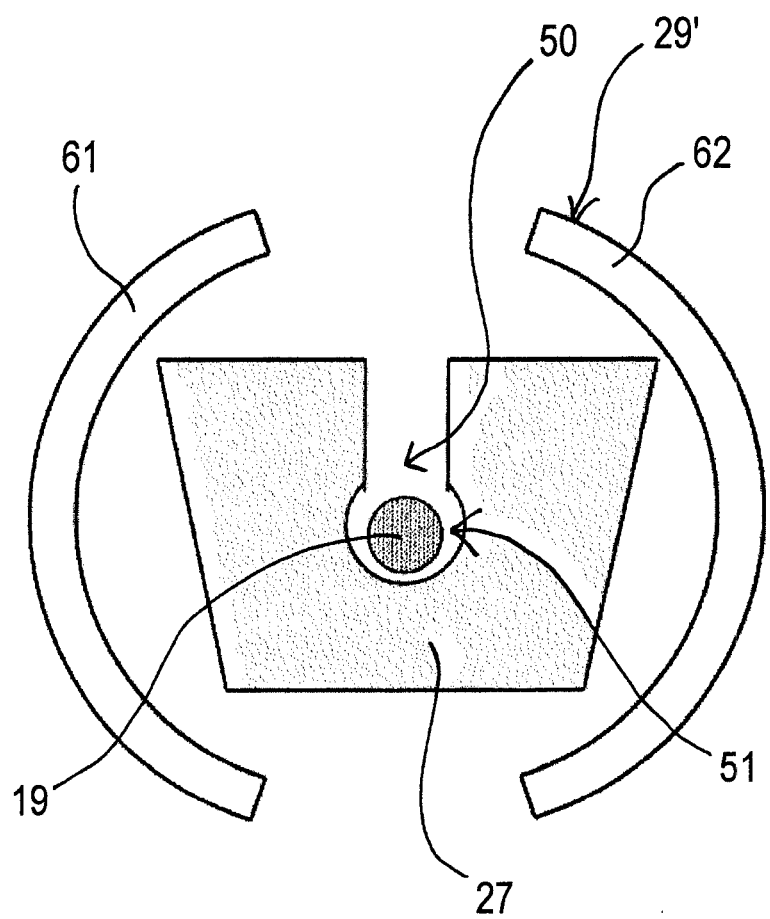
FIG. 5 shows the arrangement shown in FIG. 2 together with two intermediate shells.

FIG. 5 shows an alternative embodiment of the invention in which an arrangement 29' of two separate shell elements 61, 62 is provided instead of an intermediate pipe.

Figure 6:
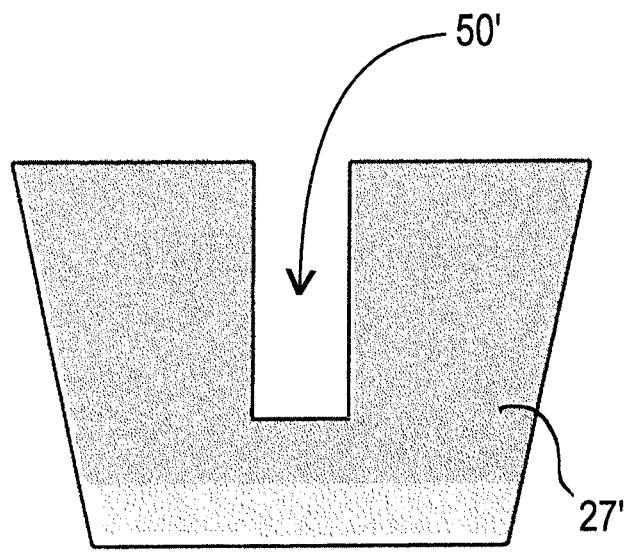
FIG. 6 shows a positioning element having an alternative design and having a rectangular recess in cross-section.
Figure 7:
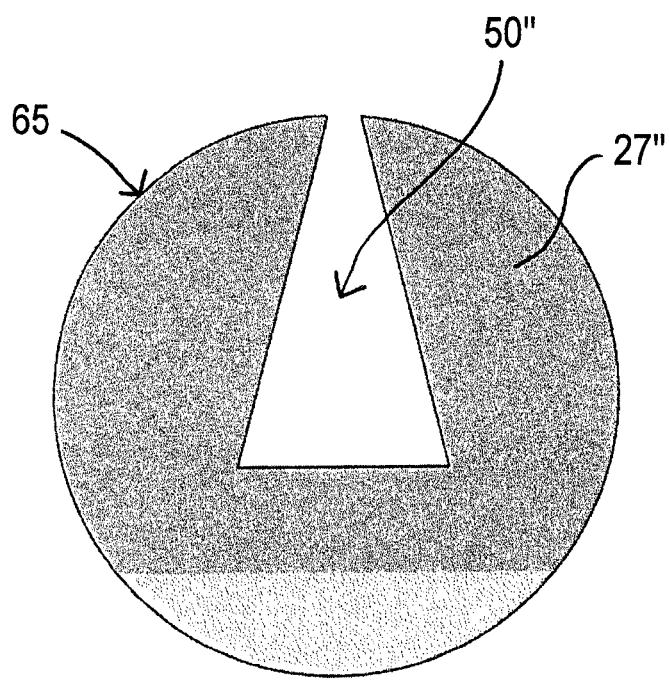
FIG. 7 shows a positioning element having an alternative design and having a round outer cross-section and a trapeze-like recess in cross-section.

FIG. 6 shows a positioning element 27' whose recess 50' has a rectangular cross-section instead of a cross-section in the form of a keyhole. In the positioning element 27" shown in FIG. 7, the recess 50" has a trapeze-like cross-sectional shape instead of a cross-sectional shape in the form of a keyhole. Furthermore, the outer cross-sectional shape of the positioning element 27" shown in FIG. 7 is circular instead of trapeze-like. This can be of advantage in specific application situations. In this design, the outer surface 65 of the positioning element 27" contacts the inner pipe over its full area when said inner pipe has a round inner cross-section.

An embodiment, not shown, provides that the positioning element 27 is directly introduced into the waveguide housing 13, i.e. without using an intermediate pipe. In particular in the case of a relatively short waveguide housing 13, it is namely not absolutely necessary to use an intermediate pipe as an introduction aid. The described positioning elements 27, 27', 27" can be configured as extruded sections, whereby a particularly inexpensive manufacture results.

To manufacture a position sensor 11 in accordance with the invention, a positioning element 27, 27', 27" is first provided in an undeformed starting state.

The waveguide 19 aligned in a straight line is then introduced from the side into the recess 50, 50', 50". The positioning element 27, 27', 27' is subsequently introduced with the received waveguide 19 into the intermediate pipe 29 and is pushed into the waveguide housing 13 together with said intermediate pipe.

The invention enables the self-centering of a magnetostrictive waveguide 19 in a waveguide housing 13 without risking an unwanted damping of the wave propagation in this respect. In addition, the assembly of a position sensor 11 based on the magnetostrictive principle is substantially simplified.

LIST OF REFERENCE NUMERALS 11 position sensor
13 waveguide housing
15 sensor head housing
17 end cap
19 waveguide
21 control unit
23 damping element
24 sleeve
25 return conductor
27, 27', 27" positioning element
29 intermediate pipe
29' arrangement
30 transducer
31 bar magnet
32 coil
33 transducer receiver
35 circuit board
37 cover part
40 boundary
41 latching tooth
42 sealing ring
43 bead
44 support ring
45 contact pin
47 position magnet
50, 50', 50" recess
51 reception section
52 introduction section
55 longitudinal slit
57 inner wall
59 corner region
60 free space
61, 62 shell element
65 outer surface
E direction of introduction
L longitudinal axis

The invention claimed is:

1. A position sensor comprising
a waveguide of magnetostrictive material, with the waveguide extending along a measurement path and being configured to conduct mechanical pulses triggered by magnetostriction;
a housing for the waveguide; and
a positioning element, the positioning element being elastic at least regionally; the positioning element being held in the housing while being deformed; and the positioning element having a recess, with the recess extending along the measurement path and forming a receiver for the waveguide,
wherein the recess has a slit, with the slit extending along the measurement path; with the slit, viewed in a cross-sectional plane, reaching from a reception section up to a boundary of the positioning element; and with the slit enabling a lateral insertion of the waveguide into the reception section.

2. The position sensor in accordance with claim 1, wherein the waveguide is received with clearance in the recess at least sectionally along the measurement path.

3. The position sensor in accordance with claim 1, wherein the positioning element completely surrounds the waveguide received in the recess in a peripheral direction when said positioning element is held in the housing while being deformed.

4. The position sensor in accordance with claim 1, wherein, with respect to a cross-sectional plane of the position sensor, the positioning element is not completely peripherally supported at an inner wall of the housing or at an additional component contacting the inner wall when said positioning element is held in the housing while being deformed.

5. The position sensor in accordance with claim 1, wherein the recess is open toward a longitudinal side of the positioning element when the positioning element is in an undeformed starting state.

6. The position sensor in accordance with claim 1, wherein the recess has a cross-sectional shape in the form of a keyhole when the positioning element is in an undeformed starting state.

7. The position sensor in accordance with claim 1, wherein the positioning element has a trapeze-like outer cross-sectional shape when it is in an undeformed starting state.

8. The position sensor in accordance with claim 1, wherein the recess has a reception section which is arranged centrally with respect to a cross-section of the housing.

9. The position sensor in accordance with claim 1, wherein the positioning element is completely produced from an elastic material.

10. The position sensor in accordance with claim 1, wherein the positioning element is produced from a non-magnetic material.

11. The position sensor in accordance with claim 1, wherein the positioning element is produced from a material which comprises one of a polymer, a plurality of polymers and silicone.

12. The position sensor in accordance with claim 1, wherein the positioning element is configured as an extruded section.

13. The position sensor in accordance with claim 1, wherein the positioning element is received in an intermediate pipe, the intermediate pipe being flexible at least regionally and in turn being configured to contact an inner wall of the housing.

14. The position sensor in accordance with claim 13, wherein the intermediate pipe is produced from a friction-reducing material and/or has a friction-reducing coating.

15. The position sensor in accordance with claim 13, wherein the intermediate pipe is at least partly produced from one of polytetrafluoroethylene and silicone.

16. The position sensor in accordance with claim 13, wherein the intermediate pipe has at least one slit, with the at least one slit extending along the measurement path.

17. The position sensor in accordance with claim 1, wherein the positioning element is received in an arrangement of at least two separate and at least regionally flexible shell elements, with the shell elements contacting an inner wall of the housing.

18. The position sensor in accordance with claim 1, wherein the housing is produced from a rigid non-magnetic material.

19. A method of manufacturing a position sensor, the position sensor comprising
  a waveguide of magnetostrictive material, with the waveguide extending along a measurement path and being configured to conduct mechanical pulses triggered by magnetostriction;
  a housing for the waveguide; and
  a positioning element, the positioning element being elastic at least regionally; the positioning element being held in the housing while being deformed; and the positioning element having a recess, with the recess extending along the measurement path and forming a receiver for the waveguide,
  wherein the recess has a slit, with the slit extending along the measurement path; with the slit, viewed in a cross-sectional plane, reaching from a reception section up to a boundary of the positioning element; and with the slit enabling a lateral insertion of the waveguide into the reception section, the method comprising the steps of:
  providing the positioning element in an undeformed starting state;
  introducing the waveguide into the recess of the positioning element; and
  introducing the positioning element with the waveguide received in the recess into the housing while deforming the positioning element,
  wherein the step of introducing the waveguide into the recess of the positioning element takes place in a radial direction through the slit of the positioning element.

20. The method in accordance with claim 19, wherein the positioning element is introduced with the waveguide received in the recess into a flexible intermediate pipe and is then introduced into the housing together with said intermediate pipe.

* * * * *